United States Patent
Bilionis et al.

(10) Patent No.: US 11,437,942 B2
(45) Date of Patent: Sep. 6, 2022

(54) SPEED CONTROL ASSEMBLY FOR APPLIANCE

(71) Applicant: WHIRLPOOL CORPORATION, Benton Harbor, MI (US)

(72) Inventors: Peter I. Bilionis, St. Joseph, MI (US); Kapil Gupta, Jhansi (IN)

(73) Assignee: Whirlpool Corporation, Benton Harbor, MI (US)

( * ) Notice: Subject to any disclaimer, the term of this patent is extended or adjusted under 35 U.S.C. 154(b) by 301 days.

(21) Appl. No.: 16/750,672

(22) Filed: Jan. 23, 2020

(65) Prior Publication Data

US 2021/0234485 A1 Jul. 29, 2021

(51) Int. Cl.
| | |
|---|---|
| B25B 21/02 | (2006.01) |
| H02P 7/22 | (2006.01) |
| A47J 43/07 | (2006.01) |
| A47J 43/08 | (2006.01) |
| F16H 25/18 | (2006.01) |
| G01D 5/14 | (2006.01) |

(52) U.S. Cl.
CPC ............ *H02P 7/22* (2013.01); *A47J 43/0705* (2013.01); *A47J 43/082* (2013.01); *F16H 25/183* (2013.01); *G01D 5/145* (2013.01)

(58) Field of Classification Search
CPC ....... H02P 7/22; A47J 43/0705; A47J 43/082; F16H 25/183; G01D 5/145; B25B 21/02
See application file for complete search history.

(56) References Cited

U.S. PATENT DOCUMENTS

| | | | |
|---|---|---|---|
| 2,671,191 | A | 10/1950 | Braski |
| 3,299,226 | A | 1/1967 | Edwards |
| 3,333,825 | A | 8/1967 | Wolter et al. |
| 3,924,169 | A | 12/1975 | Craft et al. |
| 3,943,421 | A | 3/1976 | Shibata et al. |
| 6,966,690 | B2 | 11/2005 | Yen |
| 2011/0214894 | A1* | 9/2011 | Harada ............... B25B 21/02 173/2 |
| 2018/0014820 | A1* | 1/2018 | Garadi ............... A61B 17/1622 |

FOREIGN PATENT DOCUMENTS

AU 2014253470 A1 5/2015

* cited by examiner

*Primary Examiner* — Cortez M Cook
(74) *Attorney, Agent, or Firm* — Price Heneveld LLP

(57) ABSTRACT

A speed control assembly for an appliance includes a bracket. The bracket is aligned with a slot defined by an appliance body. A cam is slidably coupled with the bracket and has an engagement edge positioned at an angle relative to the bracket. A lever is operably coupled with the cam and extends through the slot. The lever is configured to move the cam along the bracket. A slider is fixedly coupled with the bracket. A magnet housing is operably coupled with the slider and is configured to house a magnet. The magnet housing defines a recess. A ball bearing is magnetically coupled with the magnet housing and is positioned within the recess. The ball bearing is configured to be selectively engaged with the engagement edge of the cam. A Hall-effect sensor configured to detect the position of the magnet.

17 Claims, 6 Drawing Sheets

SPEED CONTROL ASSEMBLY FOR APPLIANCE

FIELD OF DISCLOSURE

The present disclosure generally relates to a speed control assembly, and more specifically, to a speed control assembly for an appliance.

BACKGROUND

Operating systems of stand mixers often include a user interface or knob to adjust a speed of the mixer. The user interface or knob are coupled with a speed control assembly for adjusting the speed.

SUMMARY OF THE DISCLOSURE

According to one aspect of the present disclosure, a speed control assembly for an appliance includes a bracket. The bracket is aligned with a slot defined by an appliance body. A cam is slideably coupled with the bracket and has an engagement edge positioned at an angle relative to the bracket. A lever is operably coupled with the cam and extends through the slot. The lever is configured to move the cam along the bracket. A slider is fixedly coupled with the bracket. A magnet housing is operably coupled with the slider and having a magnet disposed therein. The magnet housing defines a recess. A ball bearing is magnetically coupled with the magnet housing and is positioned within the recess. The ball bearing is configured to be selectively engaged with the engagement edge of the cam. A Hall-effect sensor configured to detect a position of the magnet.

According to another aspect of the present disclosure, a speed control assembly for an appliance includes a cam slidably coupled with a bracket. The bracket is positioned proximate a printed circuit board (PCB). The cam has an engagement edge positioned opposite the bracket. A slider is fixedly coupled with the bracket and defines a channel. A lever is operably coupled with the cam. The lever is configured to move the cam between the bracket and the slider. A magnet housing is slidably received by the channel of the slider and having a magnet disposed therein. A ball bearing is magnetically coupled with the magnet housing and is configured to be selectively engaged with the engagement edge of the cam. A Hall-effect sensor is configured to detect a position of the magnet.

According to yet another aspect of the present disclosure, a speed control assembly for an appliance includes a bracket. The bracket is operably coupled with an appliance body proximate an edge of a PCB. The bracket defines a bracket slot aligned with a lever slot of the appliance body. A cam is slidably coupled with the cam such that an engagement edge of the cam is positioned opposite the bracket. The engagement edge is oriented at an angle relative to the edge of the PCB. A plurality of retention spaces are defined by the engagement edge. A magnet housing is operably coupled with a slider and has a magnet disposed therein. A ball bearing is magnetically coupled with the magnet housing and is movable along the engagement edge of the cam. A Hall-effect sensor is configured to detect a position of the magnet.

These and other features, advantages, and objects of the present disclosure will be further understood and appreciated by those skilled in the art by reference to the following specification, claims, and appended drawings.

Figure 1:
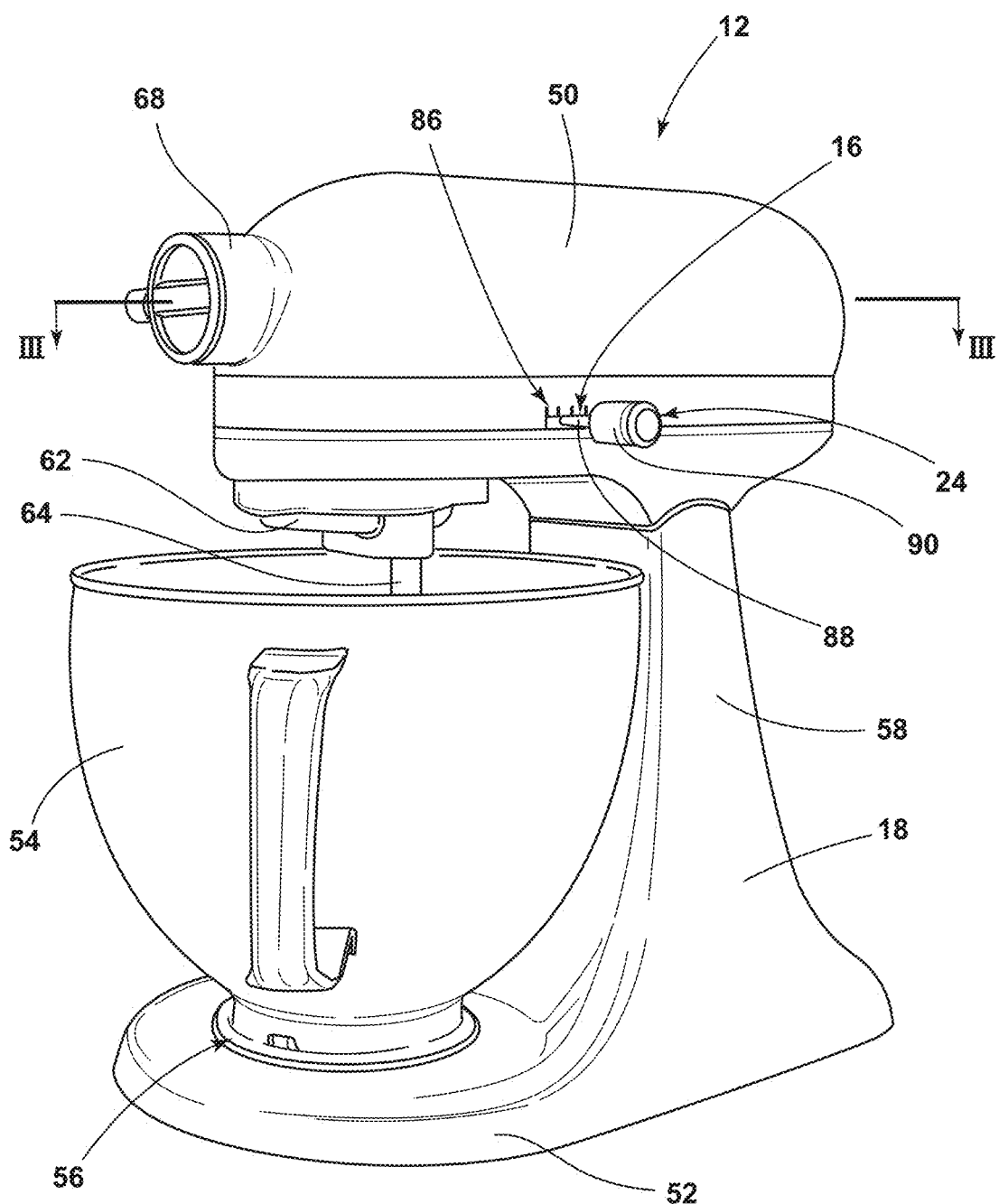
FIG. 1 is a side perspective view of a stand mixer appliance, according to various examples.

The components in the figures are not necessarily to scale, emphasis instead being placed upon illustrating the principles described herein.

DETAILED DESCRIPTION

The present illustrated embodiments reside primarily in combinations of method steps and apparatus components related to a speed control assembly for an appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-6, reference numeral 10 generally designates a speed control assembly for an appliance 12. The speed control assembly 10 includes a bracket 14. The bracket 14 is aligned with a lever slot 16 defined by an appliance body 18. A cam 20 is slidably coupled with the bracket 14 and has an engagement edge 22 positioned at an angle A relative to the bracket 14. A lever 24 is operably coupled with the cam 20 and extends through the slot 16. The lever 24 is configured to move the cam 20 along the bracket 14. A slider 26 is fixedly coupled with the bracket 14. A magnet housing 28 is operably coupled with the slider 26 and is configured to house a magnet 30. The magnet housing 28 defines a recess 32. A ball bearing 34 is magnetically coupled with the magnet housing 28 and is positioned within the recess 32. The ball bearing 34 is configured to be selectively engaged with the engagement edge 22 of the cam 20. A Hall-effect sensor 36 configured to detect a position of the magnet 30.

Referring now to FIG. 1, the appliance 12 is illustrated as a countertop stand mixer appliance ("stand mixer"). The stand mixer 12 of FIG. 1 includes the appliance body 18 including an articulating mixer head 50 and an appliance base 52. The appliance base 52 is configured to be operably coupled with a receptacle 54 for mixing. The appliance base 52 may define a receiving space 56 configured to at least partially receive the receptacle 54. A pedestal 58 may extend upward from the appliance base 52 to support the mixer head 50. The mixer head 50 includes a primary drive 62 with a drive shaft 64 extending downward from the mixer head 50 and a secondary drive 68 configured to be operably coupled with various attachments (e.g., juicer assemblies, pasta assemblies, etc.).

Figure 2:
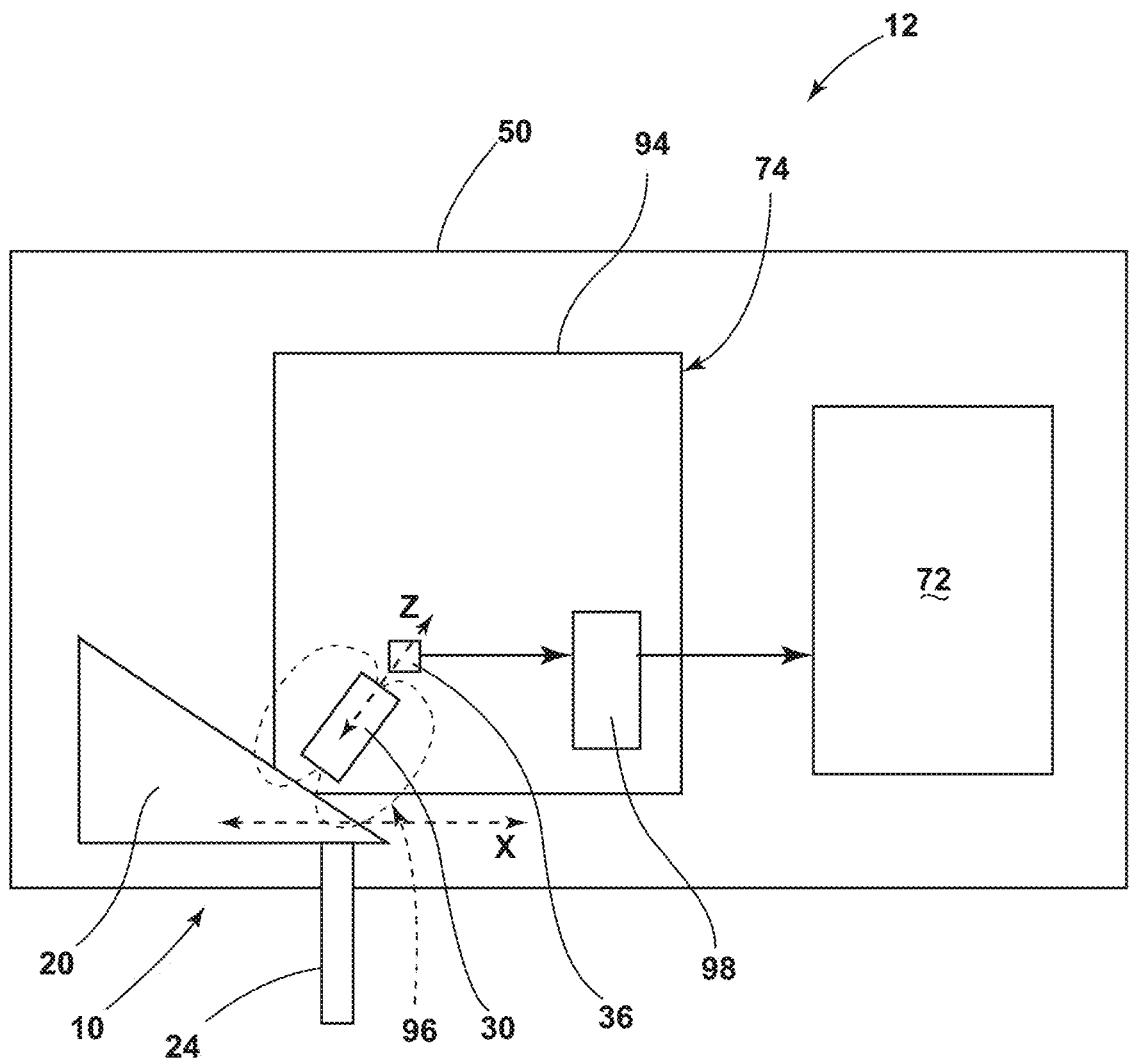
FIG. 2 is a schematic drawing of a speed control assembly for a stand mixer, according to various examples.

As illustrated in FIG. 2, the mixer head 50 further houses a motor assembly 72 and motor controls 74, including the speed control assembly 10 which is electrically coupled with the motor assembly 72 and/or the motor controls 74. The motor assembly 72 is configured to power the primary drive 62 and/or the secondary drive 68. While the stand mixer 12 is illustrated as a tilt-head stand mixer, it is contemplated that the speed control assembly 10 disclosed herein may be used with any appliance including, for example, blenders, food processors, or other motorized appliance without departing from the scope of the present disclosure.

Figure 3:
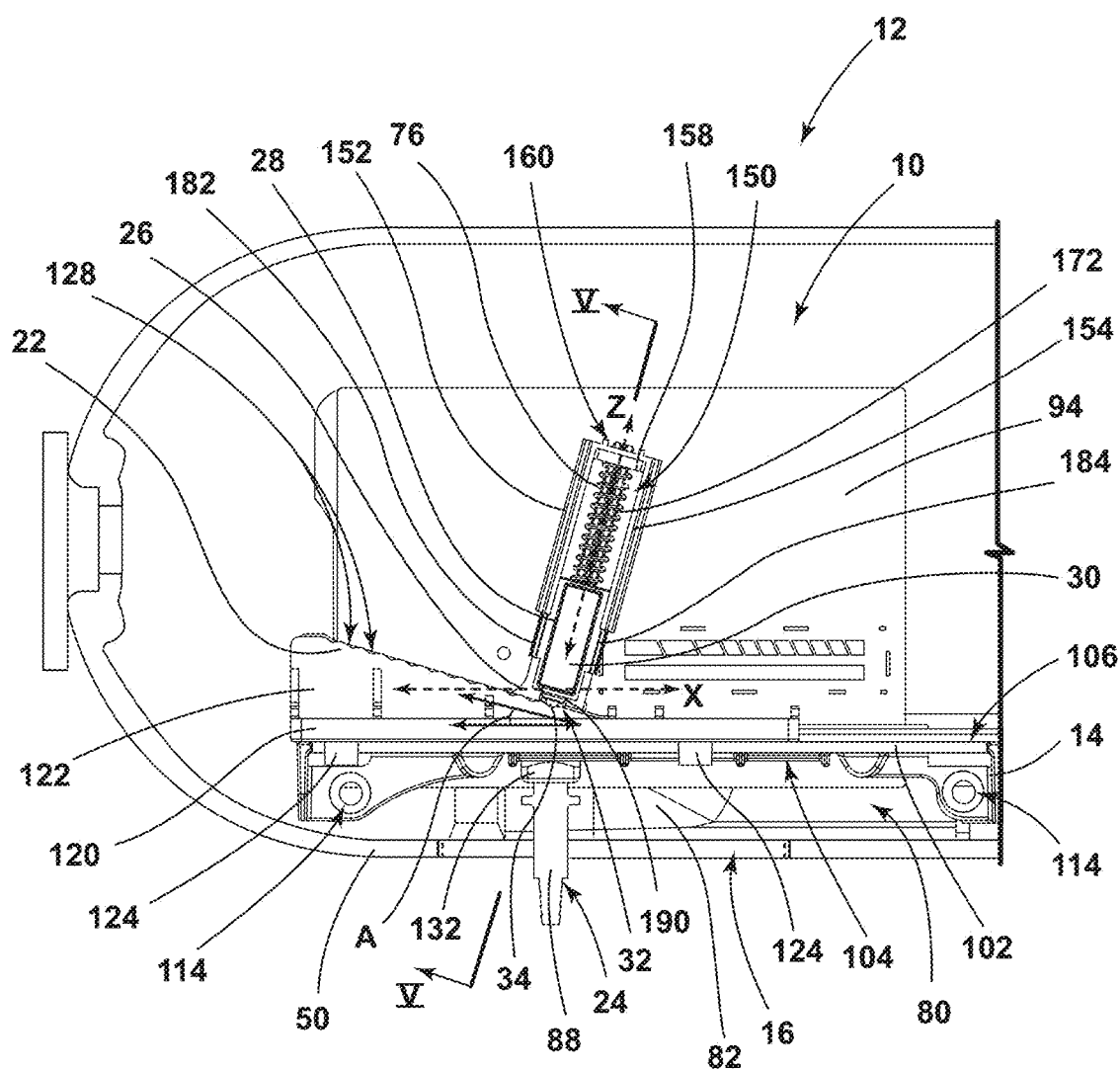
FIG. 3 is a cross-sectional view of the stand mixer appliance of FIG. 1 taken along line III-III and illustrating a speed control assembly, according to various examples.

Referring now to FIGS. 1 and 3, the mixer head 50 defines a cavity 80 configured to house at least the speed control assembly 10. A base member 82 is positioned within the cavity 80 to support various components of the stand mixer 12, including the speed control assembly 10. The base member 82 may be of a shape and size to fully extend through the cavity 80. For example, the base member 82 may be configured as a lower housing positioned within the mixer head 50. Alternatively, the base member 82 may be sized to support the various components and extend at least partially across the cavity 80 of the mixer head 50.

The mixer head 50 further defines the lever slot 16 positioned above the base member 82 and in communication with the cavity 80. The lever slot 16 extends at least partially along a side of the mixer head 50. In various examples, indicia 86 may be positioned on the mixer head 50 proximate the lever slot 16 to display a plurality of selectable speed settings to a user.

The lever slot 16 is configured to receive the lever 24. As illustrated in FIG. 1, the lever 24 is configured as a slidable control knob. The lever 24 may include an arm 88 extending through the lever slot 16 and sized to be slidable along the lever slot 16. The arm 88 may be at least partially positioned exterior of the mixer head 50 and may be operably coupled with a grip 90. The lever 24 is provided as a user control device that is accessible from an exterior of the mixer head 50 and is configured to allow a user to select one of the selectable speed settings. When the user slides the lever 24 along the lever slot 16 to select the desired speed setting (e.g., to align the arm 88 and/or grip 90 with the respective indicia 86), the motor controls 74 generally attempt to operate the motor assembly 72 at the desired speed (see FIG. 2). It is contemplated that the lever 24 may be internal to the mixer head 50 and movable by a user interface positioned exterior of the stand mixer 12 without departing from the scope of the present disclosure.

Referring now to FIG. 2, the speed control assembly 10 is schematically illustrated within the mixer head 50. The bracket 14, the slider 26, and the magnet housing 28 are removed for clarity. The Hall-effect sensor 36 is positioned on and electrically coupled with a printed circuit board (PCB) 94. The Hall-effect sensor 36 is positioned between the magnet 30 and the PCB 94. The Hall-effect sensor 36 is configured to detect a position of the magnet 30 as is moved by movement of the cam 20 during operation of the speed control assembly 10, as discussed in more detail below. The Hall-effect sensor 36 is configured to measure a magnitude of a magnetic field 96 of the magnet 30. As the magnet housing 28 is moved by movement of the cam 20, the magnetic field 96 from the magnet 30 as detected by the Hall-effect sensor 36 changes (e.g., increases as the center of the magnet 30 approaches the Hall-effect sensor 36). Based on the change in the strength of the magnetic field 96, the Hall-effect sensor 36 outputs a voltage to a controller 98. Based on the output voltage from the Hall-effect sensor 36, the controller 98 provides instructions to the motor controls 74 of the motor assembly 72 to increase or decrease the speed of the motor assembly 72. This includes, but is not limited to, turning on and off and/or adjusting the speed of the motor assembly 72.

Referring now to FIG. 3, the speed control assembly 10 is illustrated assembled within the cavity 80 of the mixer head 50. The speed control assembly 10 is further illustrated in FIG. 4 in an exploded view to illustrate the various components of the speed control assembly 10. As shown in FIG. 3, the speed control assembly 10 may be at least partially supported by the base member 82. For example, one or both of the bracket 14 and the PCB 94 may be fixedly coupled with the base member 82.

Figure 4:
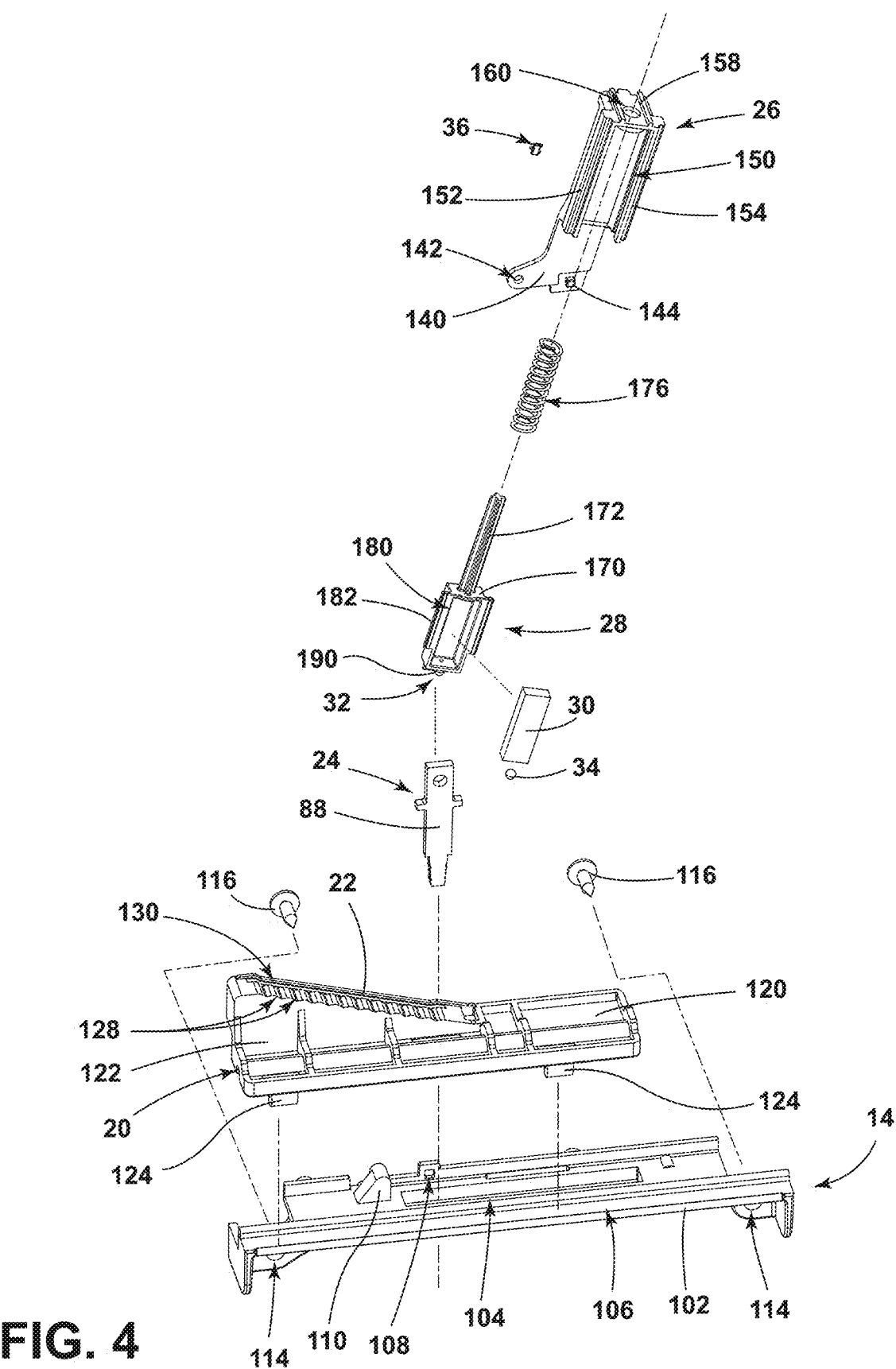
FIG. 4 is an exploded view of the speed control assembly of FIG. 3.

Referring now to FIGS. 3 and 4, the speed control assembly 10 includes the bracket 14 fixedly coupled with the mixer head 50 of the appliance body 18. The bracket 14 includes a sliding edge 102 positioned in a spaced-apart relationship with the PCB 94 and on an opposite side of the bracket 14 from the PCB 94. However, it is contemplated that the sliding edge 102 may be positioned on the same side of the bracket 14 as the PCB 94 without departing from the scope of the present disclosure.

The bracket 14 defines a bracket slot 104 extending parallel with the sliding edge 102. The bracket slot 104 is configured to be aligned with the lever slot 16 of the mixer head 50 when the speed control assembly 10 is assembled. The bracket slot 104 is configured to at least partially receive the lever 24 such that the lever 24 is slidable along the bracket slot 104 and the lever slot 16.

As best shown in FIG. 4, the bracket 14 further defines a bracket channel 106 configured to slidably receive the cam 20, as discussed in more detail below. The bracket channel 106 is generally defined to open toward the cam 20 when the cam 20 is coupled with the bracket 14. The bracket channel 106 is generally aligned parallel with the bracket slot 104 such that the cam 20 may be at least partially received by one or both of the bracket slot 104 and the bracket channel 106.

The bracket 14 further defines a plurality of receiving wells 114. As illustrated in FIG. 3, the plurality of receiving wells 114 may be defined by a lower portion of the bracket 14 positioned to align with the base member 82. However, it is contemplated that the plurality of receiving wells 114 may be defined by any portion of the bracket 14 and may be configured to align with the base member 82 and/or any other portion of the mixer head 50 without departing from the scope of the present disclosure. The plurality of receiving wells 114 are configured to receive a plurality of fasteners 116 to couple the bracket 14 with the mixer head 50 or base member 82. The plurality of fasteners 116 may be any fastener configured to couple the bracket 14 with the mixer head 50 or base member 82. When the bracket 14 is coupled with the mixer head 50 or the base member 82, the bracket 14, including the sliding edge 102, the bracket slot 104, and the bracket channel 106, extend along and are substantially parallel to an edge of the PCB 94.

Referring still to FIG. 3, the speed control assembly 10 further includes the cam 20 slidably coupled with the bracket 14. The cam 20 is fixedly coupled with the arm 88 of the lever 24 and is movable along the bracket 14 by sliding the lever 24. By coupling the cam 20 with the lever 24, a force used to operate the speed control assembly 10 and subsequently move the cam 20 is aligned with the movement of the cam 20. This alignment may provide added control during the selection of one of the plurality of speed selections using the lever 24.

With reference again to FIGS. 3 and 4, the cam 20 includes a body 120 aligned with the bracket 14 and a sloped portion 122 extending away from the body 122. The body 120 of the cam 20 may include a plurality of feet 124 configured to wrap around and engage with the sliding edge 102 of the bracket 14 when the cam 20 is coupled with the bracket 14. The plurality of feet 124 are configured to retain the cam 20 in a sliding engagement with the bracket 14 and guide the movement of the cam 20 along the bracket 14.

The sloped portion 122 extends from the body 120 and includes the engagement edge 22. As best illustrated in FIG. 3, the engagement edge 22 is positioned at an angle A relative to the body 120 of the cam 20 and the bracket 14. In other words, engagement edge 22 is positioned at an angle A relative to the body 120 of the cam 20, the bracket 14, and the edge of the PCB 94. The angle A is a predetermined angle selected based on a relationship between the movement of the cam 20 and the magnet 30, as discussed in more detail below.

The engagement edge 22 of the cam 20 defines a plurality of retention spaces 128 spaced apart along the engagement edge 22 and configured to selectively receive the ball bearing 34 when the speed control assembly 10 is assembled within the cavity 80 of the mixer head 50, as best shown in FIG. 3. The plurality of retention spaces 128 may be equally or unequally spaced along the engagement edge 22 and may be equally or unequally sized. Each of the plurality of retention spaces 128 may have a generally arcuate shape to complement the shape of the ball bearing 34.

Figure 5:
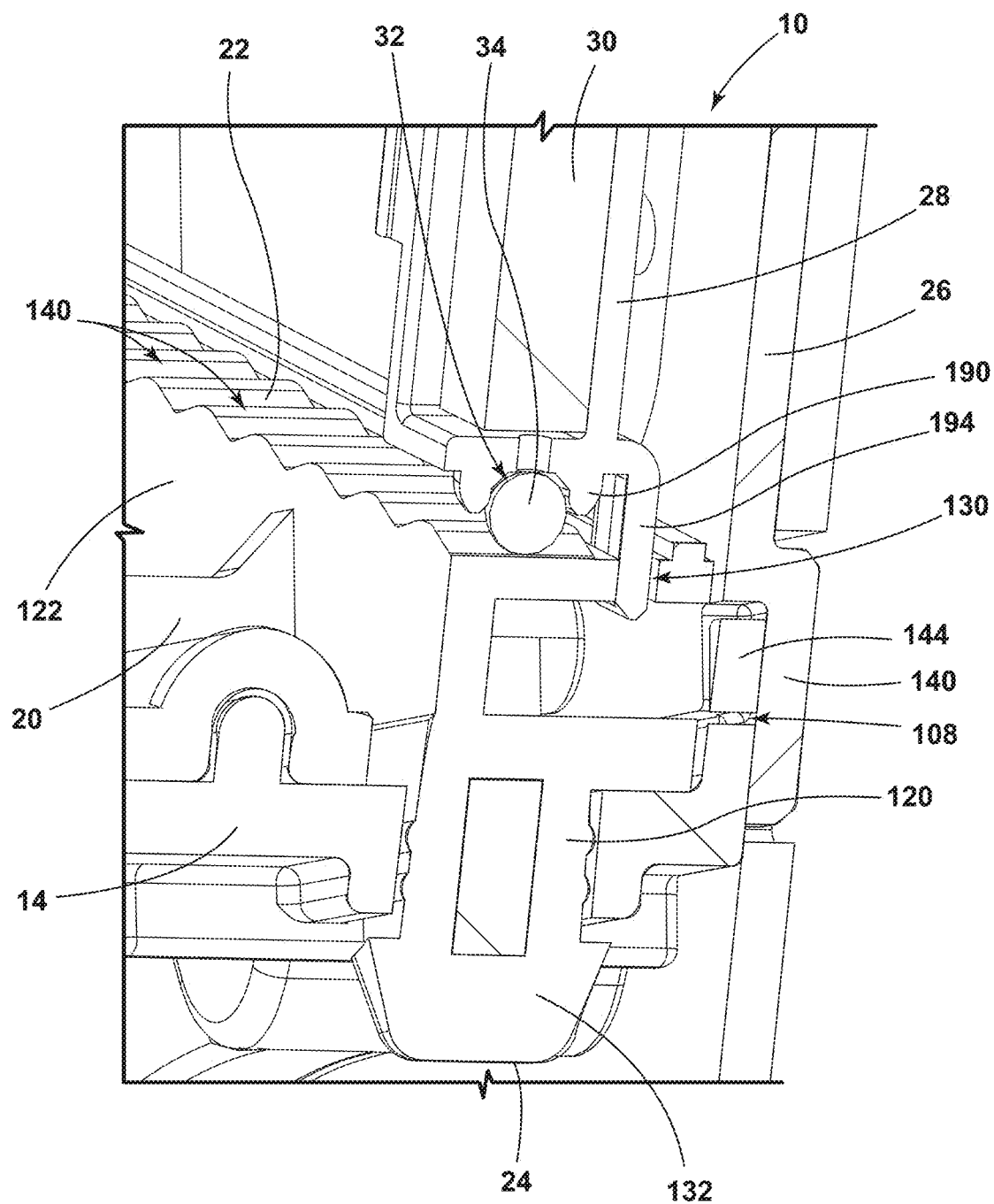
FIG. 5 is a side profile cross-sectional view of the speed control assembly of FIG. 3 taken along line V-V.

As illustrated in FIGS. 4 and 5, the engagement edge 22 of the cam 20 further defines a linear guide 130. The linear guide 130 extends along the engagement edge 22 proximate the plurality of retention spaces 128. When the ball bearing 34 is engaged with the plurality of retention spaces 128, the linear guide 130 may be configured to at least partially receive the magnet housing 28 and may guide the engagement of the magnet housing 28 with the engagement edge 22 of the cam 20, as discussed in more detail below.

Figure 6:
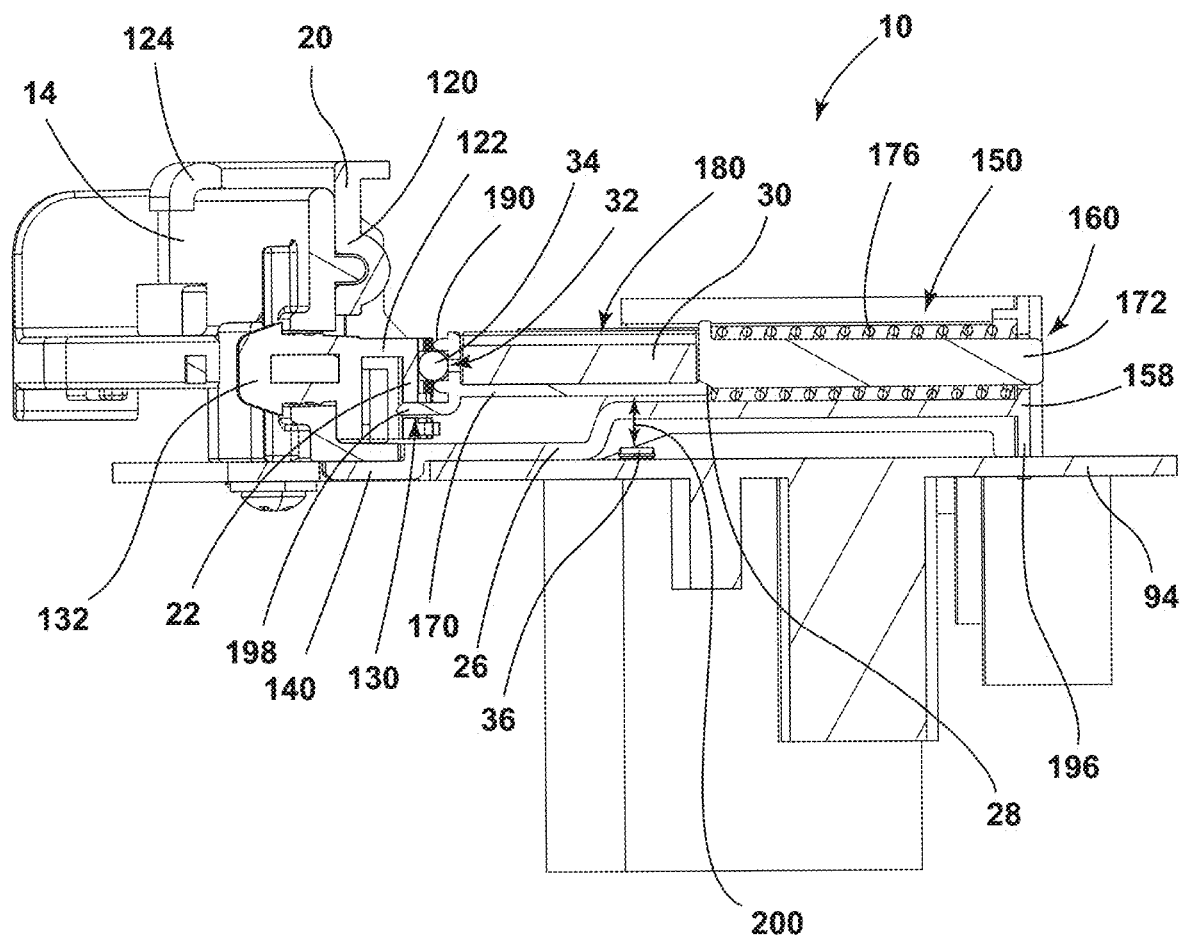
FIG. 6 is a side perspective cross-sectional view of the of a ball bearing engaged with a cam of the speed control assembly of FIG. 3 taken along line V-V.

With reference now to FIGS. 5 and 6, the cam 20 include an extension 132 configured to be at least partially received by the bracket slot 104. The extension 132 extends from the body 120 of the cam 20 in an opposite direction from the sloped portion 122. When the cam 20 is coupled with the bracket 14, the extension 132 is at least partially received by the bracket slot 104 and may be slidable along the bracket slot 104. As best shown in FIG. 3, when the speed control assembly 10 is assembled, the arm 88 of the lever 24 may be received by the extension 132 to fixedly couple the lever 24 with the cam 20. The extension 132 is configured to be coupled with the arm 88 of the lever 24 such that the arm 88 extends from the extension 132 and through the bracket slot 104 and the lever slot 16 of the mixer head 50, as previously discussed.

Referring again to FIGS. 3 and 4, the slider 26 is fixedly coupled with the bracket 14 of the speed control assembly 10. As illustrated in FIG. 4, the slider 26 includes a fixing portion 140 that defines a first aperture 142 proximate a first post 144. The first post 144 extends from the fixing portion 140 substantially perpendicular to the slider 26. The first post 144 is configured to be received by a second aperture 108 defined by the bracket 14. The second aperture 108 is defined proximate a second post 110 extending from the bracket 14 parallel to the first post 144. The first aperture 142 of the fixing portion 140 is configured to receive the second post 110, and the second aperture 108 of the bracket 14 is configured to receive the first post 144 to fixedly couple the slider 26 with the bracket 14.

With continued reference to FIGS. 3 and 4, the slider 26 extends from the fixing portion 140 and defines a slider channel 150. The slider channel 150 is at least partially defined by first and second sidewalls 152, 154 extending upward from the slider 26 in a spaced-apart configuration. The first and second sidewalls 152, 154 are configured to at least partially retain the magnet housing 28 within the slider channel 150. For example, as best illustrated in FIG. 3, the first and second sidewalls 152, 154 may be configured to extend over the magnet housing 28 to prevent inadvertent release of the magnet housing 28 from the slider 26.

An end wall 158 is positioned opposite the fixing portion 140 and extends between the first and second sidewalls 152, 154 to further define the slider channel 150. The end wall 158 extends upward from the slider 26 and defines an opening 160 in communication with the slider channel 150. The opening 160 is axially aligned with the slider channel 150 and is configured to at least partially receive the magnet housing 28 when the speed control assembly 10 is assembled, as illustrated in FIG. 3.

Referring still to FIGS. 3 and 4, the magnet housing 28 includes a body 170 configured to house the magnet 30 and a control extension 172 extending from the body 170. The body 170 defines a magnet cavity 180 configured to house the magnet 30 of the speed control assembly 10. The magnet 30 is operably coupled with the magnet housing 28 and positioned within the magnet cavity 180. The magnet 30 is configured to slide along the slider 26 with the magnet housing 28.

Referring now to FIGS. 4 and 5, the magnet housing 28 further defines the recess 32 in communication with the magnet cavity 180 of the magnet housing 28 such that the magnet 30. The recess 32 is surrounded by a rim 190 extending from the body 170 of the magnet housing 28. The recess 32 is configured to receive the ball bearing 34 such that the ball bearing 34 extends partially from the recess 32 and past the rim 190. The magnet 30 is positioned within the magnet cavity 180 and is configured to magnetically couple with the ball bearing 34 to retain the ball bearing 34 within the recess 32.

Referring now to FIGS. 3 and 4, first and second lateral wings 182, 184 extend from the body 170 proximate the magnet cavity 180 and along opposing sides of the magnet cavity 180 and the magnet 30. As best shown in FIGS. 3 and 6, the magnet housing 28 is positioned within, and slidable along, the slider channel 150 of the slider 26. The first and second lateral wings 182, 184 of the body 170 of the magnet housing 28 are configured to engage with the first and second sidewalls 152, 154 of the slider 26 when the magnet housing 28 is received within the slider channel 150. The first and second lateral wings 182, 184 are configured to at least partially retain the magnet housing 28 within the slider channel 150 and are configured to guide movement of the magnet housing 28 along the slider channel 150.

Referring now to FIGS. 4 and 6, a control extension 172 extends from the body 170 and is configured to be coupled with a spring 176. The control extension 172 is sized to be received by, and extend through, the opening 160 defined by the end wall 158. The control extension 172 may have a circular cross-section, a square cross-section, an X-shaped cross-section, or any other cross-section configured to be coupled with the spring 176 and extend through the opening 160 without departing from the scope of the present disclosure.

The spring 176 is positioned over and coupled with the control extension 172. In other words, the spring 176 wraps around or encircles the control extension 172. As best illustrated in FIG. 6, when the magnet housing 28 is coupled with the slider 26, the spring 176 is configured to abut the end wall 158 and is configured to bias the body 170 of the magnet housing 28 away from the end wall 158 of the slider 26 and towards the engagement edge 22 of the cam 20. When the control extension 172 is received by the opening 160 of the end wall 158, the control extension 172 acts as an anti-buckle feature to prevent buckling of the spring 176 within the slider channel 150.

Referring now to FIGS. 5 and 6, the body 170 of the magnet housing 28 further includes a tab 194 extending opposite the control extension 172. The tab 194 is aligned with the recess 32 and the rim 190 configured to retain the ball bearing 34. The tab 194 is sized to be received by the guide 130 of the engagement edge 22 of the cam 20. When the ball bearing 34 is engaged with the plurality of retention spaces 128, the tab 194 is inserted within the guide 130. As the ball bearing 34 moves along the engagement edge 22, the tab 194 is configured to slide along the guide 130 to guide the movement of the ball bearing 34 and prevent inadvertent disengagement of the ball bearing 34 and the engagement edge 22.

Referring again to FIG. 3, when the speed control assembly 10 is assembled, the magnet housing 28 is slidably coupled with the slider 26 and the slider 26 is fixedly coupled with the bracket 14. The cam 20 is slidably positioned between the magnet housing 28 and the bracket 14. When the cam 20 is slidably translated in a first direction X by the lever 24, the cam 20 moves along the bracket 14. As the cam 20 moves, the engagement edge 22 slides in the first direction X between the magnet housing 28 and the bracket 14. The ball bearing 34 is configured to engage with the plurality of retention spaces 128 as the cam 20 is slidably translated along the bracket 14 by the lever 24. The angle A of the engagement edge 22 causes the engagement edge 22 to press against the bias of the spring 176 in a second direction Z, moving the magnet housing 28 toward the end wall 158 of the slider 26 as the cam 20 is moved along the bracket 14. As the magnet housing 28 moves toward the end wall 158, the magnet 30 is simultaneously moved toward the end wall 158 of the slider 26.

Because the sloped portion 122 of the cam 20 includes the engagement edge 22 positioned at the angle A, the movement of the cam 20 in the first direction X is translated to movement of the magnet 30 in the second direction Z. As previously discussed and illustrated in FIG. 2, the Hall-effect sensor 36 is configured to sense the position of the magnet 30 as the magnet 30 is moved in the second direction Z by the movement of the lever 24 and the cam 20. The angle A of the engagement edge 22 is configured to provide a predetermined proportional relationship between the movement of the cam 20 and the lever 24 in the first direction X and the movement of the magnet 30 in the second direction. For example, the angle A may be configured such that from about 40 mm to 50 mm of movement of the cam 20 by the lever 24 in the first direction X provides from about 10 mm to about 14 mm of movement of the magnet housing 28 and the magnet 30 in the second direction Z along the slider 26 (e.g., for every 45 mm of movement of the cam 20 by the lever 24 in the second direction X, there is a corresponding movement of about 12 mm of the magnet housing 28 in the first direction Z).

Referring now to FIG. 6, the slider 26 further includes a spacing extension 196 extending downward from the end wall 158. The spacing extension 196 is configured to abut or align with the PCB 94 and is configured to define and maintain a spacing 200 between the PCB 94 and the slider 26. The spacing extension 196 provides space to house the Hall-effect sensor 36 and maintains the continuous spacing 200 between the Hall-effect sensor 36 and the magnet 30 as the magnet 30 moves. The continuous spacing 200 may minimize the effect of mechanical variations within the speed control assembly 10.

According to one aspect, a speed control assembly for an appliance includes a bracket. The bracket is aligned with a slot defined by an appliance body. A cam is slidably coupled with the bracket and has an engagement edge positioned at an angle relative to the bracket. A lever is operably coupled with the cam and extends through the slot. The lever is configured to move the cam along the bracket. A slider is fixedly coupled with the bracket. A magnet housing is operably coupled with the slider and has a magnet disposed therein. The magnet housing defines a recess. A ball bearing is magnetically coupled with the magnet housing and is positioned within the recess. The ball bearing is configured to be selectively engaged with the engagement edge of the cam. A Hall-effect sensor configured to detect a position of the magnet.

According to another aspect, a magnet housing includes first and second wings configured to couple the magnet housing with a slider.

According to another aspect, a speed control assembly includes a spring configured to bias a magnet housing toward an engagement edge of a cam.

According to another aspect, an engagement edge of a cam defines a plurality of retention spaces configured to selectively receive a ball bearing.

According to another aspect, a cam defines a guide extending along an engagement edge.

According to another aspect, a magnet housing includes a tab configured to be received by a guide.

According to another aspect, a speed control assembly includes a controller configured to receive output voltage from the Hall-effect sensor and provide instructions to motor controls to operate a motor assembly at a selected speed based on the position of the magnet.

According to another aspect, a speed control assembly for an appliance includes a cam slidably coupled with a bracket.

The bracket is positioned proximate a printed circuit board (PCB). The cam has an engagement edge positioned opposite the bracket. A slider is fixedly coupled with the bracket and defines a channel. A lever is operably coupled with the cam. The lever is configured to move the cam between the bracket and the slider. A magnet housing is slidably received by the channel of the slider and has a magnet disposed therein. A ball bearing is magnetically coupled with the magnet housing and is configured to be selectively engaged with the engagement edge of the cam. A Hall-effect sensor is configured to detect a position of the magnet.

According to another aspect, a slider includes an end wall defining an opening.

According to another aspect, a magnet housing includes an extension and a spring positioned over the extension. The spring is configured to bias the magnet housing away from an end wall of a slider.

According to another aspect, a slider includes a spacing extension proximate an end wall.

According to another aspect, a ball bearing is movable along an engagement edge such that the engagement edge biases a magnet housing toward an end wall.

According to another aspect, an engagement edge of a cam is positioned at an angle relative to an edge of a PCB.

According to another aspect, an engagement edge defines a plurality of retention spaces configured to selectively receive a ball bearing.

According to another aspect, a spacing extension is configured to define a spacing between a slider and a Hall-effect sensor.

According to another aspect, a speed control assembly for an appliance includes a bracket. The bracket is operably coupled with an appliance body proximate an edge of a PCB. The bracket defines a bracket slot aligned with a lever slot of the appliance body. A cam is slidably coupled with the cam such that an engagement edge of the cam is positioned opposite the bracket. The engagement edge is oriented at an angle relative to the edge of the PCB. A plurality of retention spaces are defined by the engagement edge. A magnet housing is operably coupled with a slider and has a magnet disposed therein. A ball bearing is magnetically coupled with the magnet housing and is movable along the engagement edge of the cam. A Hall-effect sensor is configured to detect a position of the magnet.

According to another aspect, a speed control assembly includes a spring configured to bias a magnet housing towards an engagement edge of a cam.

According to another aspect, a cam is operably coupled with a lever extending exterior of an appliance body.

According to another aspect, an engagement edge of a cam further defines a guide configured to at least partially receive a magnet housing.

According to another aspect, a magnet housing defines a wing configured to couple the magnet housing with a slider.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A speed control assembly for an appliance, comprising:
   a bracket aligned with a slot defined by an appliance body;
   a cam slidably coupled with the bracket and having an engagement edge positioned at an angle relative to the bracket;
   a lever operably coupled with the cam and extending through the slot, wherein the lever is configured to move the cam along the bracket;
   a slider fixedly coupled with the bracket;
   a magnet housing operably coupled with the slider and having a magnet disposed therein, wherein the magnet housing defines a recess;
   a spring configured to bias the magnet housing toward the engagement edge of the cam;
   a ball bearing magnetically coupled with the magnet housing and positioned within the recess, wherein the ball bearing is configured to be selectively engaged with the engagement edge of the cam; and
   a Hall-effect sensor configured to detect a position of the magnet.

2. The speed control assembly of claim 1, wherein the magnet housing includes first and second wings configured to couple the magnet housing with the slider.

3. The speed control assembly of claim 1, wherein the engagement edge of the cam defines a plurality of retention spaces configured to selectively receive the ball bearing.

4. The speed control assembly of claim 1, wherein the cam defines a guide extending along the engagement edge.

5. The speed control assembly of claim 4, wherein the magnet housing includes a tab configured to be received by the guide.

6. The speed control assembly of claim 1, further comprising:
- a controller configured to receive output voltage from the Hall-effect sensor and provide instructions to motor controls to operate a motor assembly at a selected speed based on the position of the magnet.

7. A speed control assembly for an appliance, comprising:
- a cam slidably coupled with a bracket positioned proximate a printed circuit board (PCB), wherein the cam has an engagement edge positioned opposite the bracket, and wherein the engagement edge of the cam is positioned at an angle relative to an edge of the PCB;
- a slider fixedly coupled with the bracket and defining a channel;
- a lever operably coupled with the cam, wherein the lever is configured to move the cam between the bracket and the slider;
- a magnet housing slidably received by the channel of the slider and having a magnet disposed therein;
- a ball bearing magnetically coupled with the magnet housing and configured to be selectively engaged with the engagement edge of the cam; and
- a Hall-effect sensor configured to detect a position of the magnet.

8. The speed control assembly of claim 7, wherein the slider includes an end wall defining an opening.

9. The speed control assembly of claim 8, wherein the magnet housing includes an extension and a spring positioned over the extension, and further wherein the spring is configured to bias the magnet housing away from the end wall of the slider.

10. The speed control assembly of claim 8, wherein the slider includes a spacing extension proximate the end wall.

11. The speed control assembly of claim 8, wherein the ball bearing is movable along the engagement edge such that the engagement edge biases the magnet housing toward the end wall.

12. The speed control assembly of claim 7, wherein the engagement edge defines a plurality of retention spaces configured to selectively receive the ball bearing.

13. The speed control assembly of claim 10, wherein the spacing extension is configured to define a spacing between the slider and the Hall-effect sensor.

14. A speed control assembly for an appliance, comprising:
- a bracket operably coupled with an appliance body proximate an edge of a printed circuit board (PCB), wherein the bracket defines a bracket slot aligned with a lever slot of the appliance body;
- a cam slidably coupled with the cam such that an engagement edge of the cam is positioned opposite the bracket and is oriented at an angle relative to the edge of the PCB;
- a plurality of retention spaces defined by the engagement edge;
- a magnet housing operably coupled with a slider and having a magnet disposed therein, wherein the engagement edge of the cam further defines a guide configured to at least partially receive the magnet housing;
- a ball bearing magnetically coupled with the magnet housing and movable along the engagement edge of the cam; and
- a Hall-effect sensor configured to detect a position of the magnet.

15. The speed control assembly of claim 14, further comprising:
- a spring configured to bias the magnet housing towards the engagement edge of the cam.

16. The speed control assembly of claim 14, wherein the cam is operably coupled with a lever extending exterior of the appliance body.

17. The speed control assembly of claim 14, wherein the magnet housing defines a wing configured to couple the magnet housing with the slider.

\* \* \* \* \*